US011772089B2

(12) United States Patent
Shakouri et al.

(10) Patent No.: US 11,772,089 B2
(45) Date of Patent: Oct. 3, 2023

(54) SCALABLE METHOD FOR PRODUCTION OF SUPPORTED CATALYSTS

(71) Applicant: UNIVERSITY OF SOUTH CAROLINA, Columbia, SC (US)

(72) Inventors: Abolfazl Shakouri, Columbia, SC (US); Horie Adabi Firouzjaie, Columbia, SC (US); John R. Regalbuto, Columbia, SC (US); Christopher T. Williams, Columbia, SC (US); William E. Mustain, Columbia, SC (US)

(73) Assignee: University of South Carolina, Columbia, SC (US)

(*) Notice: Subject to any disclaimer, the term of this patent is extended or adjusted under 35 U.S.C. 154(b) by 0 days.

(21) Appl. No.: 17/830,692

(22) Filed: Jun. 2, 2022

(65) Prior Publication Data

US 2022/0387985 A1    Dec. 8, 2022

Related U.S. Application Data

(60) Provisional application No. 63/241,231, filed on Sep. 7, 2021, provisional application No. 63/196,426, filed on Jun. 3, 2021.

(51) Int. Cl.
*B01J 37/02* (2006.01)
*B01J 21/18* (2006.01)
(Continued)

(52) U.S. Cl.
CPC ........... *B01J 37/0209* (2013.01); *B01J 21/18* (2013.01); *B01J 23/42* (2013.01); *B01J 35/023* (2013.01); *B01J 35/026* (2013.01)

(58) Field of Classification Search
CPC ........ B01J 37/0209; B01J 21/18; B01J 23/42; B01J 35/023; B01J 35/026
(Continued)

(56) References Cited

U.S. PATENT DOCUMENTS

| 6,340,773 B1 * | 1/2002 | Zhang ................... C07C 209/40 564/336 |
| 2003/0186805 A1 * | 10/2003 | Vanderspurt ......... B01J 23/6567 423/263 |

FOREIGN PATENT DOCUMENTS

| CN | 101505869 A * | 8/2009 | .......... H01M 4/9008 |
| CN | 102810677 A * | 12/2012 | .............. B01J 23/42 |

(Continued)

OTHER PUBLICATIONS

Cayman Chemical, Solubility Factors When Choosing a Sovent, Nov. 20, 2020, 9 Pages. https://www.caymanchem.com/news/solubility-factors-when-choosing-a-solvent.

(Continued)

*Primary Examiner* — Patricia L. Hailey
(74) *Attorney, Agent, or Firm* — Dority & Manning, P.A.

(57) ABSTRACT

Disclosed are methods for forming a supported catalyst and catalysts formed according to disclosed methods. Methods include contacting a catalyst support with a precursor solution and displacing the solvent of the precursor solution (e.g., water) with a second solvent that has a lower surface tension than the first solvent. The second solvent displaces the first solution according to the Marangoni effect. Methods also include activation of the precursor to form a catalyst, e.g., a supported platinum group metal catalyst or the like.

19 Claims, 11 Drawing Sheets

(51) Int. Cl.
    *B01J 35/02*     (2006.01)
    *B01J 23/42*     (2006.01)
(58) Field of Classification Search
    USPC ................................................ 502/104, 325
    See application file for complete search history.

(56) References Cited

FOREIGN PATENT DOCUMENTS

| CN | 107262023 A | * | 10/2017 | ............. B01J 20/10 |
|----|-------------|---|---------|--------------------------|
| CN | 110449136 A | * | 11/2019 | ............. B01D 53/44 |
| CN | 109300701 B | * | 11/2020 | ............. H01G 11/24 |

OTHER PUBLICATIONS

Comsol, The Marangoni Effect, 2017, 6 Pages. Retrieved Feb. 17, 2023 from website https://www.comsol.com/multiphysics/marangoni-effect.

Donaldson et al., Wettability, Book, 2008. (Abstract Only) https://doi.org/10.1016/C2013-0-15527-4.

do Nascimento et al., Pore Scale Visualization of Drainage in 3D Porus Media by Confocal Microscopy, Science Reports, vol. 9, Article No. 12333, 2019, 11 Pages. https://doi.org/10.1038/s41598-019-48803-z.

Faghri et al., Transport Phenomena in Multiphase Systems, 2006, 1046 Pages. Uploaded as A, B, C, and D https://vdoc.pub/documents/transport-phenomena-in-multiphase-systems-7vh38700j690.

Gao et al., Probing the Dynamics of Nanoparticle Formation from a Percursor at Atomic Resolution, Science Advances, vol. 5, Issue 1, Jan. 25, 2019, 7 Pages. https://www.science.org/doi/epdf/10.1126/sciady.aau9590.

Halpern, General Chemistry: An Atoms First Approach, Chapter 13.2: Solubility and Structure, Howard University, 2021, 15 Pages. https://chem.libretexts.org/Courses/Howard_University/General_Chrmistry:_An_Atoms_First_Approach/Unit_5:_States_of_Matter/Chapter_13:_Solutions/Chapter_13.2:_Solubility_and_Structure.

Shi et al., Drying of Ethanol/Water Droplets Containing Silica Nanoparticles, ACS Applied Materials & Interfaces, vol. 11, Issue 15, 2019, pp. 14275-14285. (Abstract Only) https://doi.org/10.1021/acsami.8b21731.

Therrien et al., An Atomic-Scale View of Single-Site Pt Catalysis for Low-Temperature CO Oxidation, Nature Catalysis, vol. 1, 2018, pp. 192-198. (Abstract Only) https://nature.com/articles/s41929-018-0028-2.

Xiong et al., Enhanced Performance of Oxygen-Functionalized Multiwalled Carbon Nanotubes as Support for Pt and Pt—Ru Bimetallic Catalysts for Methanol Electrooxidation, ACS Applied Energy Materials, vol. 3, Issue 6, 2020, pp. 5487-5496. (Abstract Only) https://dx.doi.org/10.1021/acsaen.0c00477.

* cited by examiner

SCALABLE METHOD FOR PRODUCTION OF SUPPORTED CATALYSTS

CROSS REFERENCE TO RELATED APPLICATIONS

This application claims filing benefit of U.S. Provisional Patent Application Ser. No. 63/196,426, entitled "Scalable Method to Produce Single-Atom Catalysts on Support Substrates," having a filing date of Jun. 3, 2021, and of U.S. Provisional Patent Application Ser. No. 63/241,231, entitled "Scalable Method for Production of Supported Catalysts," having a filing date of Sep. 7, 2021, which are both incorporated herein by reference for all purposes.

BACKGROUND

Transition metals, including precious metals, are commonly utilized in chemical synthesis, as well as in catalyzing electrochemical reactions such as oxygen reduction reactions, hydrogen oxidation reaction, hydrogen evolution reactions, oxygen evolution reactions, nitrogen reduction reactions, and carbon dioxide reduction reactions, all of which play a key role in development of sustainable energy systems.

Extremely high surface area and single atom catalysts are highly desirable as they can provide the highest possible utilization efficiency of the catalyst materials with high activity levels and selectivity, as well as can provide unique reactivity in some embodiments. Unfortunately, formation of such catalysts remains difficult and elusive, particularly for large scale production.

Typical catalyst formation methods include defect engineering, metal support interaction, heteroatom tethering, spatial confinement, and atomic alloying among others. While aspects of the various formation approaches can vary greatly, many catalyst formation techniques include wet chemistry approaches in which a salt solution of the catalyst precursor is deposited on a support. Following deposition, the solution is dried to provide precursor ions on the support. Subsequent activation of the precursor ions forms the catalyst. Unfortunately, such formation techniques do not adequately prevent migration and agglomeration of the precursor ions, and thus, relatively large precursor crystallites and subsequent catalyst nanoparticles are formed rather than the preferred smaller and single atom catalysts.

While methods other than wet chemistry approaches have been suggested for catalyst formation, such as atomic layer deposition approaches, these methods are quite expensive and not scalable for useful industrial production.

What are needed in the art are wet chemistry-based methods for forming catalysts that are highly efficient, effective for any desired catalytic material, and scalable for wide production in a variety of industrial applications. Methods that can be used to controllably form small catalyst nanoparticles, in addition to single atom catalysts, would be of great benefit in the art.

SUMMARY

According to one embodiment, disclosed is a method for forming a supported catalyst. A method can include dissolving a precursor salt in a first solvent to form a first precursor solution. The method can also include contacting a support with the solution such that following the contact, the solution is present on a surface of the support. Following, the first solvent of the solution on the support surface can be displaced with a second solvent. The second solvent can have a lower surface tension on the support than the first solvent, and as such, the second solvent can displace the first solution according to the Marangoni effect. Following the solvent displacement, the precursor can be activated to form the catalyst. For instance, the support/solution composite can be heated to an activation temperature under a $H_2O$-free atmosphere to first remove the solvent and then the temperature can be ramped up to an activation temperature in the presence of an activating gas, e.g., hydrogen.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

Disclosed are easily scalable wet chemistry methods for forming catalysts that can be utilized in forming single atom or high surface area nanoparticle catalysts of any sort on any suitable support. In addition, disclosed methods can produce any desired density of catalyst on a support, up to the nominal maximum concentration of a single monolayer on the support surface.

Disclosed methods have been developed through insight to the root causes of precursor ion migration and agglomeration common in previously known wet chemistry approaches. In particular, disclosed methods have been developed through understanding of the affinity of precursor ions toward the high dielectric constant solvents used in traditional wet chemistry formation techniques (generally water) combined with the surface tension of the high dielectric constant solvents on the supports of interest and the effect of interactions between precursor ions and support materials on the solvent surface tension. The combined result of such interactions leads to migration and agglomeration of the precursor ions, with eventual formation of relatively large nano-sized particles of the catalysts.

To resolve these issues, the presently disclosed methods utilize a two-solvent approach in which an initial solvent that exhibits desirably high dielectric constants and dipole moments so as to be useful for initial formation of a precursor solution can be displaced with a second solvent following application of the initially formed solution to a support. The second solvent can be one that exhibits a lower surface tension on the support and prevents agglomeration of the precursor ions prior to and during activation. In some embodiments, a method need not include drying of the support and removal of the solvent prior to activation. In other embodiments, however, the solvent(s) of a solution can be removed prior to activation by drying in an atmosphere that is free of water. Beneficially, through displacement of a first solvent with a second solvent, disjoining pressure between precursor ions in the second solvent can be retained during activation, and as such, there is no need in disclosed methods to include anchoring functional sites on a support surface as is often required in other previously known catalyst formation techniques.

Figure 1:
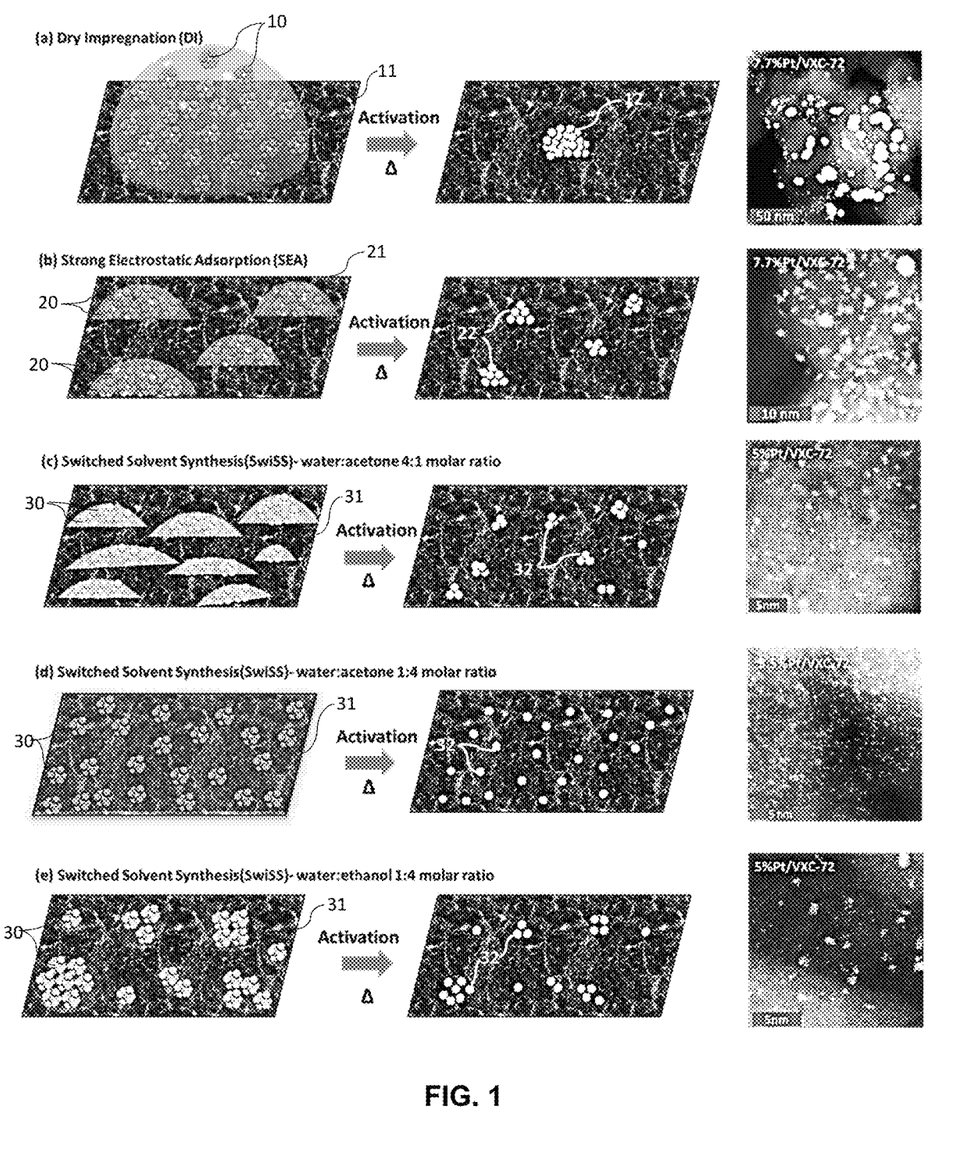
FIG. 1 schematically compares different catalyst synthesis methods and presents aberration corrected scanning transmission electron microscope (AC-STEM) images of catalysts formed according to each method.

FIG. 1 compares previously known catalyst formation approaches including a dry impregnation method (DI) and a strong electrostatic adsorption method (SEA) with representative examples of the present disclosure, referred to herein as a Switched Solvent Synthesis (SwiSS) method. Each technique is schematically illustrated at the end of a drying process, at which time a small amount of solvent remains and following activation. FIG. 1 also includes AC-STEM images of catalysts formed according to each process. All catalysts are platinum (either 7.7%, 5%, or 3.5% as indicated) on a carbon black (Vulcan® XC72; VXC72) support.

The DI method shown at (a) includes impregnation of a support 11 with a solution including a precursor ions 10. In general, the solvent is water. Following drying and activation (e.g., calcination and/or reduction), the resulting catalyst particles 12 are relatively large. In this method, when a small amount of water remains in the system, the water can break up into small droplets as shown in the left panel. The high surface tension and large dielectric constant of water exerts an attractive force on the precursor ions and causes the precursor ions 10 to agglomerate together to form crystallites and relatively large nanoparticles 12 during activation.

At (b) of FIG. 1 is illustrated a catalyst formation according to an SEA approach. In this approach, deposition of charged metal precursor ions 20 is affected due to electrostatic (non-specific) interaction between the metal precursor ions 20 and the oppositely charged support 21, though some systems can exhibit chemical (specific) interactions with the support 21 in addition to the electrostatic interactions. The strong electrostatic adsorption of the catalyst precursor ions 20 onto the support 21 alters the interfacial tension of the support-water interface, resulting in much smaller droplets and consequently smaller nanoparticles 22 as shown.

At (c), (d), and (e) of FIG. 1 are illustrated the disclosed SwiSS method utilizing water as the first solvent and either acetone ((c) and (d)) or ethanol (e) as the second solvent, with the water:acetone molar ratio varied from 4:1 in (c) to 1:4 in (e). As indicated, upon replacement of the first solvent (water) with the second solvent, the precursor ions 30 can be present on the support 31 in small droplets (as at (c)), individual precursor ions 30 (as at (d)) or small agglomerations of precursor ions 30 (as at (e)). Following activation, the resulting catalysts 32 can be in the form of extremely small nanoparticles (c), single atom catalysts (d), or clusters of single atom catalysts (e).

As utilized herein, the term "single-atom catalyst" can refer to an ensemble that includes an atom of any element (metal, metalloid, non-metal, halogen) that is spatially isolated from atoms of the same chemical identity and directly adhered (e.g., physically and/or chemically bonded) to a solid support. The electronic structure of a minority element can be significantly hybridized with a host due to the degree of orbital overlap (e.g., heteroatom-doped carbons). Diversity of anchoring sites in a host support can result in various structural and electronic coordination environments so the active centers are not necessarily uniform. Either organic or inorganic ligands may be present in a catalyst/support composite due to synthesis procedures or reaction conditions comprising surface-supported organometallic catalysts. A characteristic of a single atom catalyst is that the single atom is directly involved in the catalytic cycle keeping single atom catalysts apart from single atom dopants/promoters and catalytically active agglomerates (i.e., dimers, trimers, clusters, or nanoparticles) during reaction.

The presently disclosed methods are based upon the identification of problems, such as those mentioned above, due to the use of highly polar solvents such as water in wet chemistry-based catalyst formations. Water is the most common solvent for ionic compounds because of its high polarity, i.e., the negative (oxygen) side of a dipolar water molecule attracts—and is attracted by—any positive ion in solution and similarly, the positive (hydrogen) ends of water molecules are attracted to negative ions, providing excellent solvating characteristics. Unfortunately, however, the use of such solvents also leads to the formation of relatively large nanoparticles during drying and activation of the catalyst.

Disclosed methods answer these issues by utilizing two different solvents during a catalyst formation process. A first solvent can be one that is useful for initial formation of a precursor solution, e.g., water or another highly polar solvent. A second solvent can be selected that can exhibit suitable polarity so as to maintain the precursor in solution but also exhibits a lower surface tension on the support as compared to the first solvent so as to prevent the formation of droplets, and consequently, agglomeration of the precursor ions prior to and during activation.

According to disclosed methods, a first solvent of a precursor solution can be displaced, or switched, with a second solvent prior to activation. The second solvent can be a wetting solvent that exhibits a lower surface tension on the support than the first solvent and that can form a uniform thin film of a precursor solution during activation of the catalyst.

Depending upon the parameters of a formation approach, disclosed methods can be utilized to produce single atom catalysts or small nanoparticle catalysts. For instance, relative dielectric constant, surface tension, viscosity, boiling point, hydrogen bonding and other physical properties of the two solvents can affect the characteristics of a formed catalyst. The ratio of the solvents, heating ramp, and activation process of the catalyst can also be utilized to control the final form of the catalyst.

Similar to traditional catalyst formation approaches, disclosed formation processes include initial formation of a solution by combination of a first solvent with a precursor salt. The precursor salt can be a salt of the catalyst of interest, e.g., a transition metal salt in the form of a bicarbonate, carbonate, chlorate, perchlorate, cyanide, hydroxide, iodate, nitrate, nitrite, sulphate, hydrogen sulphate, sulphite, dithionate, thiosulphate, alkoxide, carboxylate, sulphonate, halide, etc.

By way of example, when forming a PGM catalyst including palladium or platinum, representative palladium salts can include, for instance, a palladium(II) halide, palladium(II)-chloride or palladium nitrate, or an appropriate ammine-complex thereof such as tetraammine palladium nitrate. Representative platinum salts can include hexahaloplatinic acid, such as hexachloroplatinic acid optionally in the presence of hydrochloric acid, or the appropriate platinum ammine complexes, such as platinum ammine hydroxide and tetraammine platinum nitrate.

In one embodiment, the first solvent can be water, but this is not a requirement of disclosed methods, and the first solvent can be any solvent suitable for providing a solution of the precursor of interest.

By way of example, and without limitation, Table 1 and Table 2, below, provide examples and physical characteristics of typical polar protic (Table 1) and aprotic (Table 2) solvents as may be utilized in disclosed methods.

TABLE 1

| Solvent | Dielectric Constant | Dipole Moment | Boiling Point (° C.) | Surface Tension (mN/m) |
|---|---|---|---|---|
| Water | 80.1 | 1.85 | 100 | 72.80 @ 20° C. |
| Methanol | 33.0 | 1.69 | 64.5 | 22.70 @ 20° C. |
| Ammonia | 31.6 | 1.42 | −33.34 | — |
| Ethanol | 25.3 | 1.69 | 78.3 | 22.10 @ 20° C. |
| n-propanol | 20.1 | 1.68 | 97 | 24.00 @ 25° C. |
| Isopropyl alcohol | 19.92 | 1.66 | 82.5 | 23.00 @ 20° C. |
| t-butanol | 10.9 | 1.70 | 83 | 20.00 @ 25° C. |
| Acetic acid | 6.20 | 1.74 | 118 | 27.00 @ 25° C. |

TABLE 2

| Solvent | Dielectric Constant | Dipole Moment | Boiling Point (° C.) | Surface Tension (mN/m) |
|---|---|---|---|---|
| Dimethylsulfoxide (DMSO) | 46.68 | 3.96 | 189 | 42.27 @ 30° C. |
| Dimethylformamide (DMF) | 36.71 | 3.86 | 153 | 37.10 @ 20° C. |
| Acetonitrile (MeCN) | 38.8 | 3.92 | 81.6 | 29.10 @ 20° C. |
| Hexamethylphosphoric acid (HMPA) | 30.0 | 5.54 | 233 | — |
| Acetone | 20.7 | 2.88 | 56 | 25.20 @ 20° C. |
| Dichloromethane | 8.93 | 1.60 | 39.6 | 26.50 @ 20° C. |
| Tetrahydrofuran | 7.58 | 1.75 | 66 | 26.40 @ 20° C. |
| Methyl acetate | 6.7 | 1.69 | 57 | 24.50 @ 25° C. |
| Ethyl acetate | 6.02 | 1.78 | 77.1 | 23.20 @ 25° C. |

Following formation, a precursor solution, including the first solvent, can be applied to a support. There is no particular limitation on supports that can be utilized in the formation process, and generally, any support known or unknown suitable for supporting the catalyst in the desired application can be utilized. For instance, and depending upon the desired application of the catalyst, a support can be highly stable in harsh environments for chemical applications and/or can exhibit good electrical conductivity for electrochemical applications.

Supports may be either porous or non-porous. They may be three-dimensional structures, such as a powder, granule, tablet, extrudates, or other three-dimensional structure. Supports can be in the form of high surface area particles having an average particle size in the nanometer or micrometer size range (e.g., from about 5 nm or greater, or about 10 nm or greater in some embodiments, and about 100 μm or less, about 50 μm or less, about 500 nm or less, or about 100 nm or less in average particle size) and can exhibit a high surface area, for instance, on the order of about 10 $m^2/g$ or higher. Supports may also be in the form of two-dimensional structures, such as films, membranes, coatings, or other mainly two-dimensional structures. They may be one-dimensional structures, such as fibers or other essentially linear structures. In some embodiments, supports can be porous, which can serve to increase the surface area of the support and deposition density of catalyst on the support.

Supports can include, without limitation, carbon-based materials, metal oxides (e.g., alumina ($Al_2O_3$), zirconia ($ZrO_2$), ceria ($CeO_2$), ceria-zirconia composites (CeZrOx), magnesia (MgO), etc.), as well as mixed oxides such as aluminosilicate ($SiO_2/Al_2O_3$). Other representative support materials can include, without limitation, kieselguhr, diatomaceous earth, bentonite or other clays, and the like. Porous supports can include zeolites, natural or synthetic, or other materials having an ordered or quasi-ordered pore structure. Carbon-based support materials can include, without limitation, carbon black, activated carbon, graphite, fluorinated carbon, diamond, and the like. Other useful classes of support materials include organic solids, such as polymers, and metals and metal alloys.

Beneficially, disclosed methods provide for deposition of precursor ions on a support without agglomeration, and as such, there is no requirement in disclosed systems for the inclusion of reactive functionality on the support as anchoring groups. However, in some embodiments, it may be desirous to include functional groups on the surface of the support. By way of example, functionality on the surface of a support can be included to increase the wetting characteristics of a precursor solution, and as such, can improve uniform spreading precursor ions across a support, for instance through electrostatic adsorption. Functionality of a support can be utilized to affect one or more properties of a catalyst system including, without limitation, oxidation state, stability, and reactive characteristics of the system.

When incorporated on a support, functionalizing can be in the form of small organic molecules as well as polymers and oligomers bonded to a support surface. Suitable functional groups can include, without limitation, one or more of a hydroxyl, a carboxyl, carbonyl, an amine, an amide, an amino acid, a thiol, a sulfonic acid, a sulfonyl halide, an acyl halide, a nitrile, a nitrogen with a free lone pair of electrons (e.g., pyridine), combinations of these, or derivatives of these. Examples of bifunctional functionalizing agents that can be utilized to functionalize a support can include diacids such as oxalic acid, malonic acid, maleic acid, succinic acid, and the like; dialcohols such as ethylene glycol, propylene glycol, 1,3-propanediol, and the like; and hydroxy acids such as glycolic acid, lactic acid, and the like. Useful polyfunctional molecules include sugars such as glucose, polyfunctional carboxylic acids such as citric acid, hydroxy diacids, and the like. Other useful functionalizing agents can include ethanolamine, mercaptoethanol, 2-mercaptoacetate, amino acids such as glycine and alanine, sulfonic acids such as sulfobenzyl alcohol and sulfobenzoic acid, and other sulfobenzyl compounds having amino and thiol functional groups.

Application of the first precursor solution to a support can be carried out according to any suitable fashion, with a preferred application technique generally depending upon the form of the support. For instance, when considering a particulate supporting material, the supporting material can simply be dispersed in the solution. Supports having a larger dimension, e.g., films, membranes, fibers, etc., can be coated with a precursor solution via dipping, submersion, etc.

A second solvent can be added to a system following application of the initial precursor solution to the support. Upon this addition, the second solvent can displace and replace the initial solvent at the support surface. The addition can be carried out according to any suitable methodology, with a preferred approach generally depending upon the nature of the catalytic system. For instance, in those embodiments in which the support is a particulate and the first precursor solution system is in the form of a suspension or dispersion, the addition of the second solvent can be carried out simply by adding an amount of the second solvent to the suspension/dispersion. In those embodiments in which the support is of a larger form, e.g., a film, fibers, or the like, and the support is immersed in or coated with the first precursor solution, an amount of the second solvent can be added to the system.

In general, the amount of the second solvent to be added to the system can be greater than the amount of the first solvent in the system. For instance, the molar ratio of the second solvent to the first solvent can be greater than 1, greater than 2, or greater than 3, in some embodiments. For instance, the molar ratio of the second solvent to the first solvent can be from 1:1 to 10:1, or from about 2:1 to about 8:1, in some embodiments.

Figure 2:
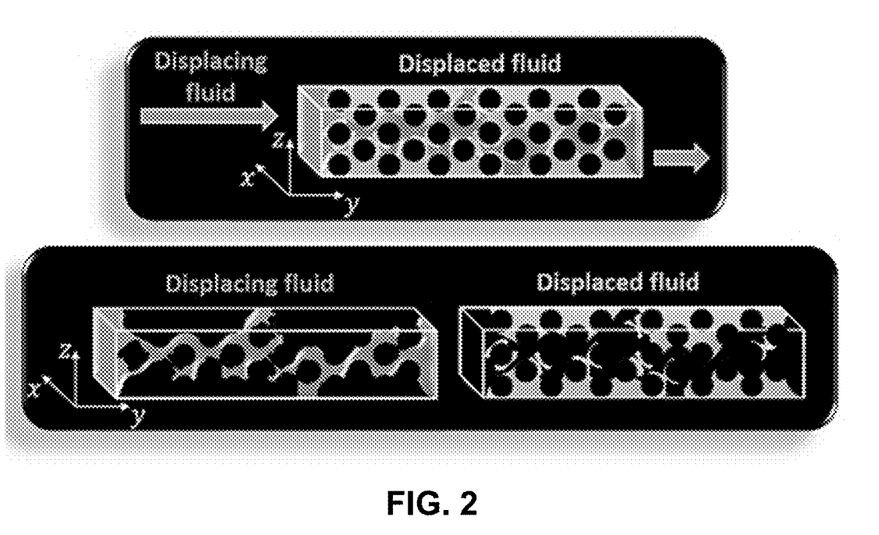
FIG. 2 schematically illustrates a solvent displacement process according to a formation method as described herein.

In order to successfully replace the initial solvent, the second solvent can have a lower surface tension on the support as compared to that of the first solvent. The displacement of the first solvent with the second solvent is schematically illustrated in FIG. 2. Without wishing to be bound by any particular theory, it is understood that the Marangoni effect provides the driving force for replacement of the first solvent and the resulting desirable distribution of precursors on the support during activation.

The Marangoni effect (also known as the Gibbs-Marangoni effect) describes mass transfer along an interface between two fluids due to a gradient of the surface tension at the interface. As surface tension can depend on temperature, this phenomenon is also referred to as thermo-capillary convection. Briefly, a permanent nonuniformity of temperature or concentration (for a multicomponent system) at an interface between two fluids can cause a surface tension gradient. The interfacial area with lower surface tension expands at the expense of an area with greater surface tension, which in turn establishes a steady flow pattern in the liquid. FIG. 2 illustrates this effect for disclosed systems in which the lower surface tension solvent (the displacing fluid) can displace the higher surface tension solvent (the displaced fluid) at the surface of the supporting materials (represented by black circles in the figure). The lower panel of FIG. 2 shows the single image of the upper panel separated, showing only the displacing fluid component of the upper panel image in the left image and showing only the displaced fluid component of the upper panel image in the right image.

Following displacement, the lower surface tension of the second solvent can prevent droplet formation as the second solvent dries prior to or during the initial stages of activation, and as such, can prevent agglomeration of the precursor ions at this stage of the catalyst formation. In addition, the second solvent can improve formation of single atom or ultra-small nanoparticle catalysts due to improved disjoining pressure as compared to a higher surface tension first solvent. When a liquid film on a support becomes very thin, the intermolecular attractive forces between the molecules in the liquid and those in the solid tend to pull the liquid to the liquid film. For a flat liquid film, absent capillary pressure, the total pressure in the liquid film can be changed by an amount referred to as the disjoining pressure, causing the liquid pressure to be less than the vapor pressure and generating a pressure gradient within the thin liquid film. The disjoining pressure can be considerably effective as long-range intermolecular forces in the range of 0.2 to 10 nm spacing regardless of the medium between the species originating in van der Waals forces including London dispersion and electrostatic interactions.

The disjoining pressure becomes more significant in case of ultra-thin liquid films as will form on a support surface as the surface dries and the precursor is activated. This increased significance is due to the fact that the liquid-vapor interface of an ultra-thin film is closer to the solid surface which can be explained by $$P_d(\delta) = -\frac{2A_H}{\pi(n-2)(n-3)}\delta^{3-n}$$

in which Pd is the disjoining pressure on a liquid film of thickness $\delta$. $A_H$ is the Hamaker constant that relates the interactive van der Waals energy to the distant of separation between two molecules where the interactive forces are independent of intervening media. The interactions between particles are relative to the refractive index n and the dielectric constant $\epsilon$. The Hamaker constant takes account for both temperature dependent forces like Keesom and Debye polar molecular forces and temperature independent forces like London dispersion forces resulting from the orbiting electron frequency and the refractive index, n. The Hamaker constant may be related to the interfacial tension between the two surfaces separated by intermolecular distance, δ.

The fluid properties such as density, volatility, viscosity, van der Waals forces, and molecular electrical interacting forces control the spreading characteristics of a fluid. The disjoining pressure (i.e., the pressure required to lift the liquid from solid) is a product of attractive van der Waals forces, electrostatic forces, and hydration forces which suggests that in an equilibrium thin film containing precursor ions in the second solvent, which is a relatively low surface tension solvent, the liquid molecules will better adhere to the solid support and maintain the precursor ions dispersed on the solid support as the solvent dries and leaves the support surface.

Following displacement of the first solvent with the second solvent, the support can carry a solution of the second solvent and the precursor ions at a surface of the support. The precursor can then be activated to form the catalyst. In order to avoid formation of large catalyst nanoparticles, the support with the second solvent/precursor solution at the surface should not be contacted with water, as the precursor may be capable of adsorbing moisture from the surrounding atmosphere which can lead to the formation of precursor crystallites and subsequent catalyst in relatively large nanoparticle form. Accordingly, in one embodiment, the support and solvent/precursor solution composite can be transferred to a reducing atmosphere or other activation atmosphere without drying. In other embodiments, the solvent/precursor solution can be dried to remove the second solvent (and any remaining first solvent in the system) prior to activation, but in this embodiment, the drying step can be carried out in a water-free environment, e.g., under an inert atmosphere, or in a reducing atmosphere.

Activation of the precursor can be carried out according to standard procedures for the catalyst system. By way of example and without limitation, activation can be carried out by heating the system to an activation temperature, e.g., about 150° C. or higher, about 300° C. or higher, or about 500° C. or higher, in the presence of a reducing gas, e.g., hydrogen.

Activation can be carried out by use of an activation furnace, e.g., placing the precursor materials in an activation furnace either prior to or following drying of the materials. In some embodiments, a high throughput activation approach can be used. For instance, in some embodiments, the solvent can be removed in conjunction with catalyst activation by use of a water-free reducing gas flow passing over the composition at an activation temperature. For instance, a 10% $H_2/N_2$ gas flow at a desired activation temperature can be utilized. Such an approach can provide for ease in scale-up of a formation process, allowing for formation of large quantities of single atom or extremely small nanoparticle catalysts.

Through utilization of disclosed methods, catalyst systems including high densities of single atom or ultra-small nanoparticle catalyst (e.g., less than about 5 nm, less than about 4 nm, less than about 3 nm, or less than about 2 nm, in some embodiments, for instance, from about 0.5 nm to about 3 nm, in some embodiments) on a wide range of insoluble support materials can be formed.

Figure 10:
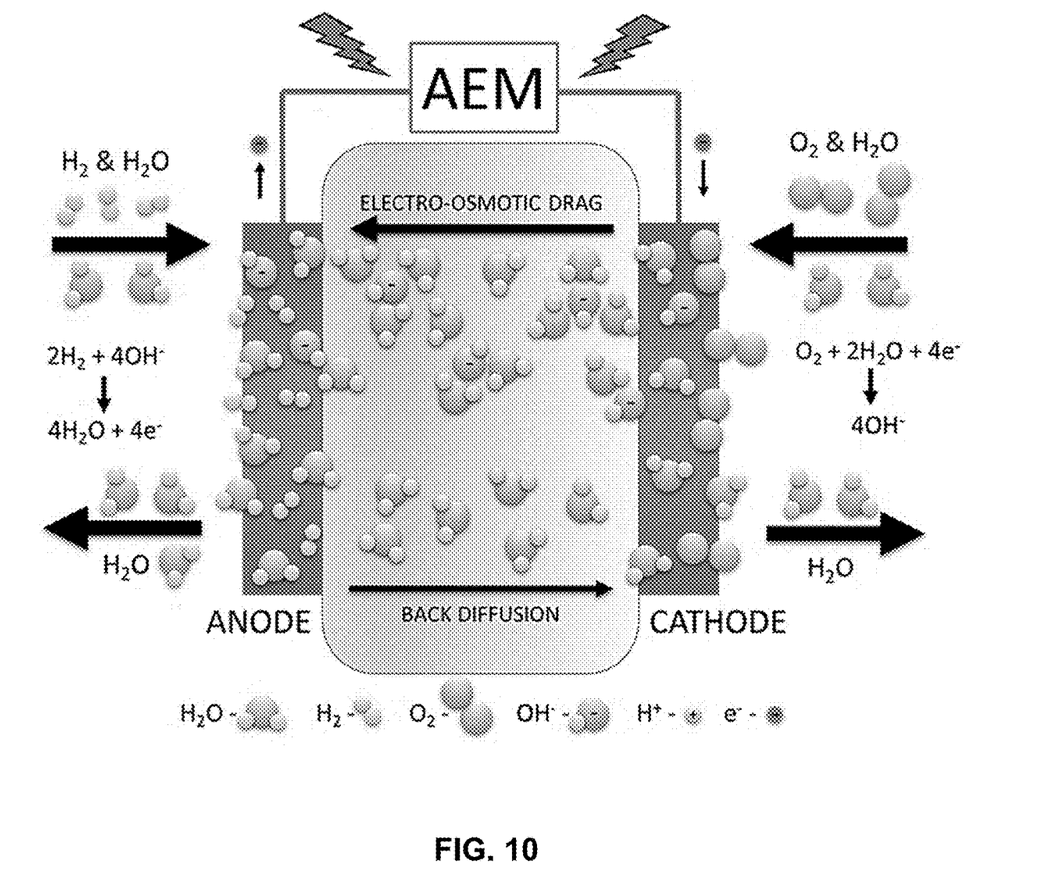
FIG. 10 schematically illustrates an anion exchange membrane fuel cell, including reactions and mass transport, as may incorporate a catalyst as described herein.

Disclosed catalysts can be utilized in one embodiment in polymer electrolyte membrane fuel cells, and in one particular embodiment, in anion exchange membrane fuel cells, a schematic of one embodiment of which is illustrated in FIG. 10. Low temperature polymer electrolyte membrane fuel cells have been touted as the future of high-efficiency energy conversion for transportation applications. The dominating technology in this space has been the proton exchange membrane fuel cell (PEMFC). Despite their strong and constantly improving performance, PEMFCs have yet to find widespread commercial success. One approach that modifies the cell chemistry while maintaining most of the architectural features of PEMFCs is the transition from acidic to alkaline membranes, creating a so-called anion exchange membrane fuel cell (AEMFC). AEMFC can operate at higher pH, which provides a less corrosive environment than PEMFCs. This can allow for wider range of affordable materials to be used for a number of cell components, including the bipolar plates, membranes, and catalysts.

Disclosed catalysts can utilize 12 to 15 times less precious metal than larger catalysts of the same materials, as disclosed, formation processes can provide the catalysts in the form of single atoms and ultra-small nanoparticles. Moreover, disclosed catalysts can demonstrate better performance and durability than commercially available catalysts.

The present disclosure may be better understood with reference to the Examples set forth below.

Example 1

Figure 3:
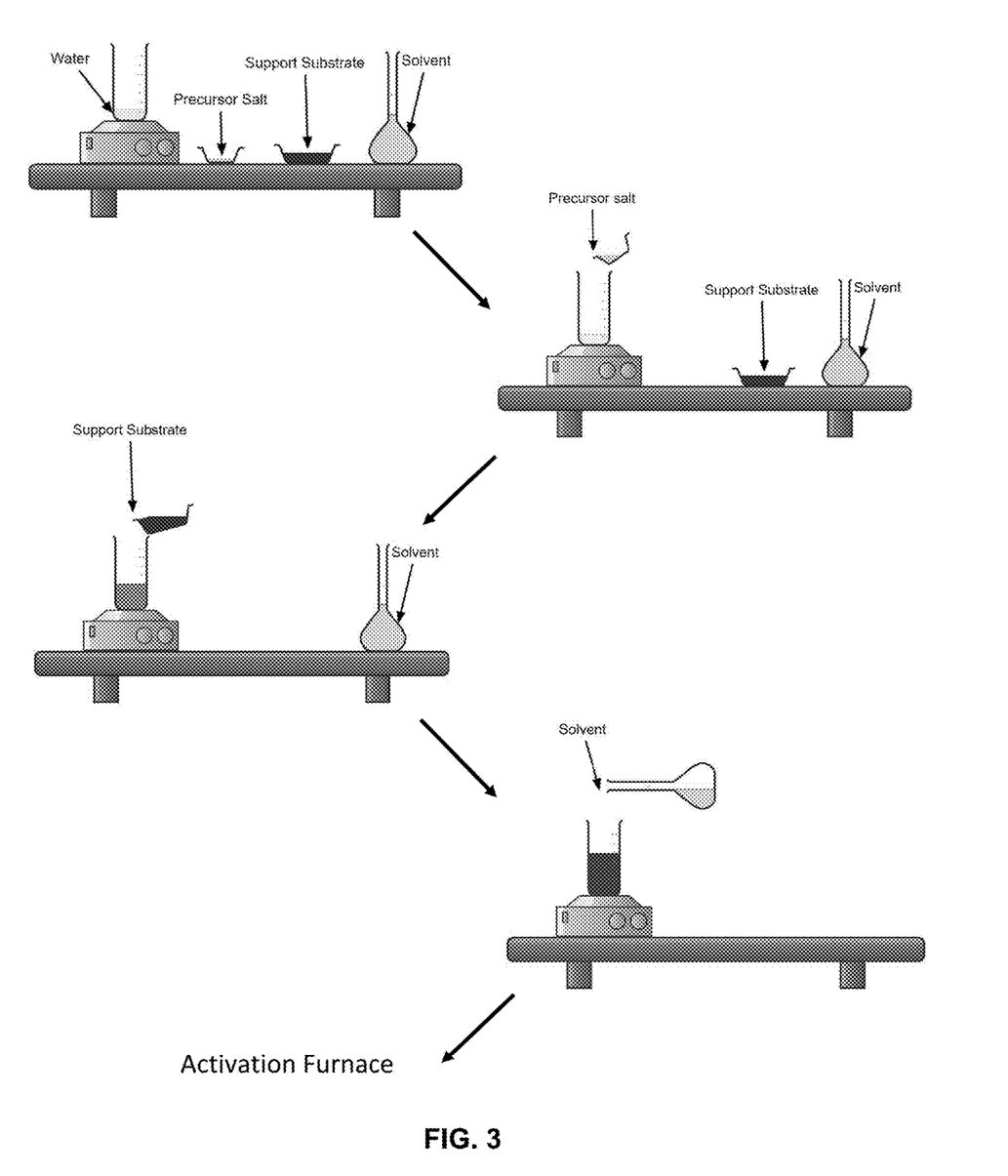
FIG. 3 schematically illustrates a catalyst formation process as utilized in the Examples section, set forth below.

Catalyst systems were formed including transition metal catalyst on carbon-based particulate supports. Support materials included either diamond or carbon black (VXC-72). FIG. 3 schematically presents the formation process used. The procedure started with dissolution of a predetermined amount of a precursor salt in water as the first solvent. The water volume was the same as the titrated pore volume of the support or slightly higher. The support substrate was then added to the precursor solution and mixed thoroughly. Following, the second solvent was added to the mixture. The molar ratio of second solvent-to-water was 4:1. The suspension was then mixed thoroughly using a vortex mixer for 1 minute at 3000 rpm. The resulting suspension was then loaded into a combustion boat and transferred into a tube furnace where the suspension was dried under flow of 10% $H_2$ balance $N_2$ at 50° C. The furnace was then ramped up to the final activation temperature. The diameter of the tube in the tube furnace was 1 inch and the total flowrate of the gas was 300 sccm.

Figure 4:
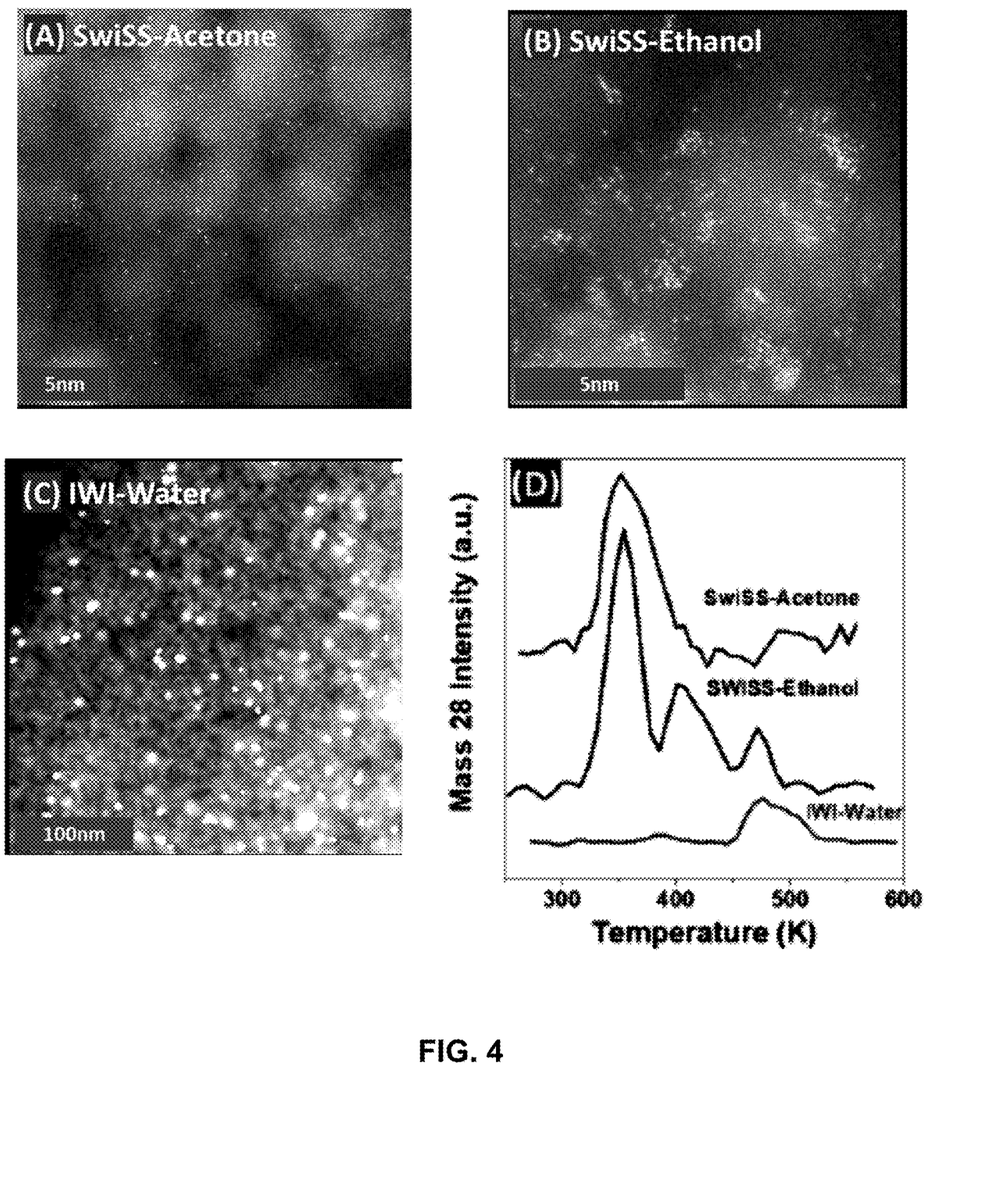
FIG. 4 presents AC-STEM images and carbon monoxide temperature programmed desorption (CO-TPD) results of catalysts formed according to disclosed methods and a traditional incipient wetness formation method.

FIG. 4 at (A) presents an AC-STEM image of 2% Pt/Diamond prepared by the presently disclosed switched solvent method using acetone as the second solvent. Acetone has a dipole moment D of 2.88, which is larger than that of water (D=1.85), and as such, the acetone molecules can interact with the precursor ions more strongly than water molecules. Acetone also has a much lower surface tension and viscosity than water with higher wetting properties. The resulting catalyst was in the form of well-dispersed single atom catalyst.

FIG. 4 at (B) presents an AC-STEM image of 2% Pt/Diamond prepared by the presently disclosed switched solvent method using ethanol as the second solvent. Ethanol has a dipole moment of 1.66, smaller than that of water. In this case, it was not expected for ethanol to replace the hydration sheath of the precursor's ions. Also, ethanol and water both form hydrogen bonds, and the viscosity of ethanol is slightly higher than water. However, ethanol has much lower surface tension than water so it can act as a wetting solvent to some extent. As indicated in FIG. 4 (B), the form of the catalyst included single atoms, dimers, trimers, clusters, and ultra-small nanoparticles (e.g., less than about 2 nm) formed.

At (C) of FIG. 4 is illustrated 2% Pt/Diamond prepared with only water as solvent at incipient wetness (also referred to as dry impregnation) condition according to traditional formation methods. As can be seen, the ultra-small nanoparticles of FIG. 4 (B) are much smaller species in comparison to the catalyst formed by traditional methods shown at (C).

CO-TPD is a characterization tool to distinguish between SACs and catalysts containing nanoparticles. The preliminary results shown in FIG. 4 at (D) demonstrate the difference in CO desorption temperature from SACs and sample containing nanoparticles. The top curve shows CO desorption temperature from the 2% Pt/Diamond catalyst formed with acetone as second solvent and, as shown, the thermal desorption temperature was about 350 K. The bottom curve shows the desorption temperature for the catalyst nanoparticles formed using only water with the desorption temperature at almost 480 K. Because a large fraction of Pt atoms was inside the nanoparticles and thus were not accessible to adsorb CO, the intensity of the CO desorption peak is much smaller than the systems containing single atoms and ultra-small clusters with almost all Pt atoms being accessible. The middle curve was the result from the catalyst formed using ethanol as the second solvent and shows three CO desorption peaks from the three different species. The peak at 350 K is attributed to the single atoms and the peak at 480 K is attributed to nanoparticles, while the peak at 400 K was attributed to the Pt dimers and trimers in the catalyst.

The samples were further characterized in XPS chamber but because the diamond support is not conductive, a neutralizer electron gun was necessary to compensate for the electron used in XPS measurements. However, the small size of the Pt single atoms and clusters led to shifts to lower binging energy in Pt 4f peaks because of electron overcompensation.

Figure 5:
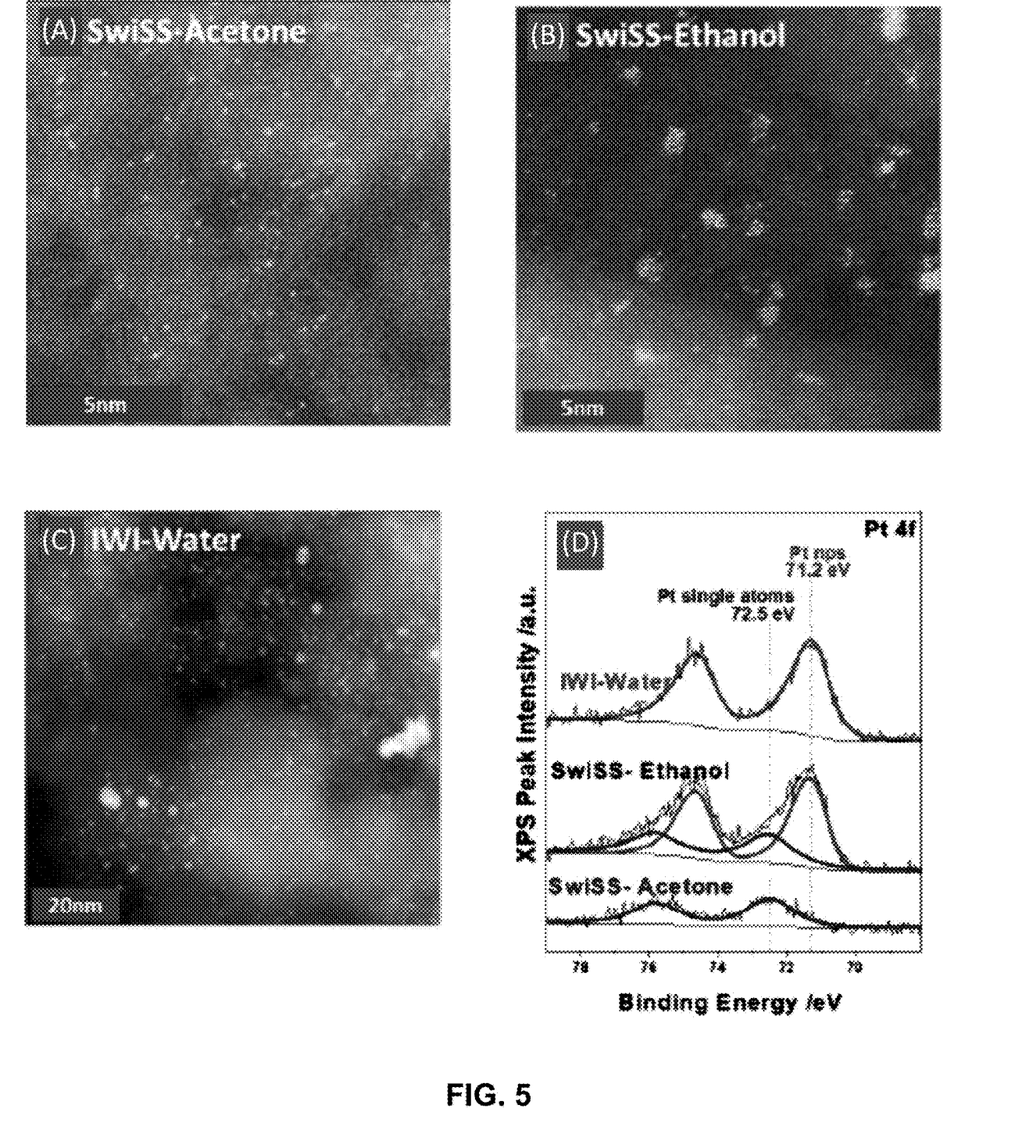
FIG. 5 presents AC-STEM images and X-ray photoelectron spectroscopy (XPS) spectra results of catalysts formed according to disclosed methods and a traditional incipient wetness formation method.

Identical procedures and solvents were then utilized to synthesize the catalysts on conductive Volcan® XC-72, which has a specific surface area close to that of diamond, 257 m$^2$/g. The AC-STEM images are presented in FIG. 5 at (A) acetone as second solvent, (B) ethanol as second solvent, and (C) water as only solvent. FIG. 5 presents the XPS characterizations of the catalyst systems at (D). The in situ XPS measurement of Pt 4f peaks of 2% Pt/VXC-72 formed with water as the only solvent and containing nanoparticles demonstrated a Pt 4f peak at 71.2 eV (top curve), which is expected for nanoparticles as reported in literature. The Pt 4f peak for the sample with only single atoms and formed with acetone as the second solvent is shown in the bottom curve in which the Pt 4F peak is shifted to 72.5 eV. The sample containing single atoms and clusters formed using ethanol as the second solvent demonstrated two Pt4f peaks at both 71.2 and 72.5 eV, as shown.

Example 2

Figure 6:
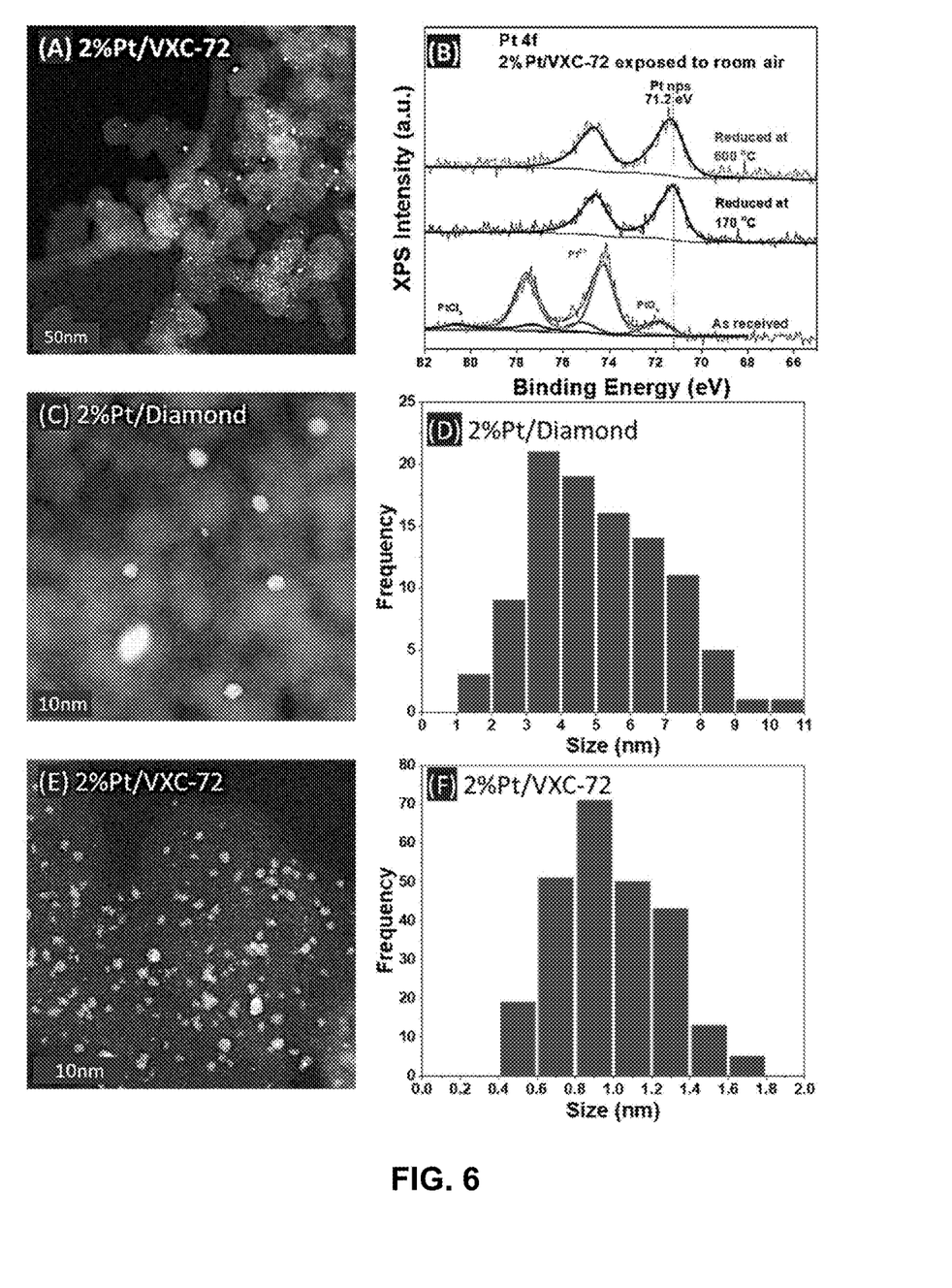
FIG. 6 presents at (A) AC-STEM image of 2% Pt/VXC-72 catalyst formed as described herein but exposed to room air (moisture) overnight before activation; (B) XPS spectra of 2% Pt/VXC-72 as received, following in situ reduction at 170° C., and following in situ reduction at 600° C.; (C) AC-STEM image of 2% Pt/Diamond; (D) particle size distribution of this catalyst upon activation at 300° C. for 3 hours; (E) AC-STEM image of 2% Pt/VXC-72; and (F) particle size distribution activated at 300° C. for 3 hours.

To demonstrate the importance of water content of a system before activation, a catalyst was prepared as described in Example 1 using acetone as the second solvent. However, instead of activating the catalysts immediately, the catalyst was dried under a fume hood overnight, similar to the commercial procedure using the incipient wetness method. FIG. 6 at (A) shows the AC-STEM image of 2% Pt/VXC-72 that was dried and exposed to the room air (moisture) prior to activation at 170° C. The in situ XPS spectra of the catalyst prior to activation, the catalyst in situ reduced at 170° C., and the catalyst in situ reduced at 600° C. are presented at (B). As indicated, the dried catalyst shows that different Pt species are present in the catalyst. After the first in situ reduction, there was only one species formed and the Pt 4f peak position was in agreement with Pt nanoparticles shown in at (A). To confirm that the Pt 4f peak was attributed to only nanoparticles, the sample was reduced at 600° C. the Pt 4f peak positions were compared. The results indicated that the disclosed switched solvent method is very sensitive to the moisture. The unreduced precursor ions were capable of adsorbing moisture from the surrounding air and forming crystallites upon drying and nanoparticles after activation. Thus, the presently disclosed methods can include no exposure of the precursor materials to an atmosphere containing moisture prior to catalyst activation.

The stability of these catalysts was investigated by heating them to 300° C. under flow of 10% H$_2$ balance N$_2$. FIG. 6 at (C) and (E) shows AC-STEM images of the catalyst on each support material, respectively, with the particle size distributions shown at (D) and (F). The diamond surface did not have any defects or functional groups, so the particle size distribution of the catalysts had a large average particle size about 5 nm (D). However, there were also a lot of single atoms left in the 2% Pt/Diamond catalyst because the anchoring sites were not in proximity of all single atoms. The surface of the Volcan® XC-72 support on the other hand, contained a large number of defects on the surface, including micropores, which prevented sintering of the single atoms to some extent and upon sintering the single Pt atoms sintered into smaller nanoparticles with an average particle size about 1 nm (F).

Example 3

Figure 7:
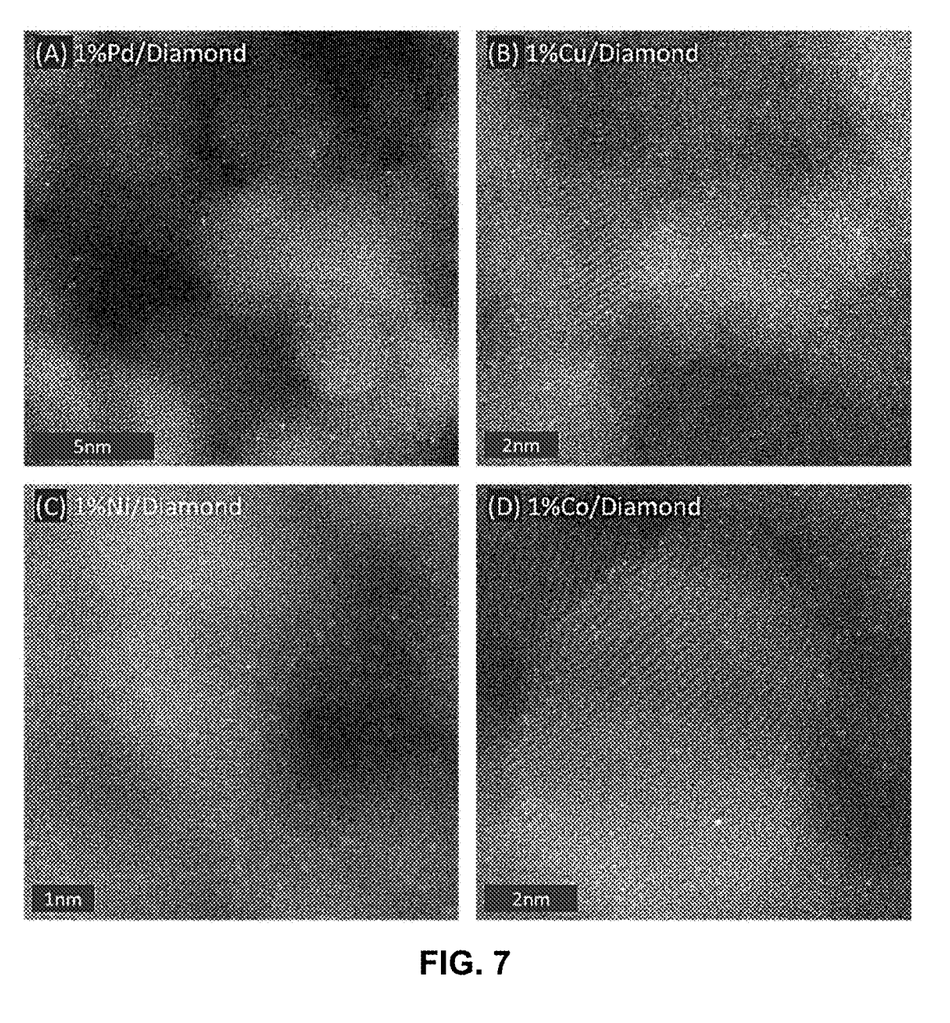
FIG. 7 presents AC-STEM images of several different catalysts formed according to disclosed methods.

To demonstrate the applicability of disclosed methods to a variety of transition metal catalysts without the need of any functional ligands on the support surfaces or precursor materials, multiple different catalyst systems were formed according to the method described in Example 1, including different transition metal catalyst materials, acetone as the second solvent, and diamond as the support material. FIG. 7 illustrates AC-STEM images of the results including 1% Pd/Diamond using tetraamminepalladium nitrate as precursor salt (A), 1% Cu/Diamond using copper nitrate as precursor salt (B), 1% Ni/Diamond using nickel nitrate as precursor salt (C), and 1% Co/Diamond using cobalt nitrate as precursor salt (D).

Example 4

Anode side and cathode side catalysts typical for use in fuel cells were formed according to disclosed methods utilizing acetone (1:1 ratio of acetone:water) as the second solvent to form ultra-small nanoparticles and single atom clusters on either VXC-72 or a nitrogen-doped graphitic carbon (N—C) support material.

Figure 8:
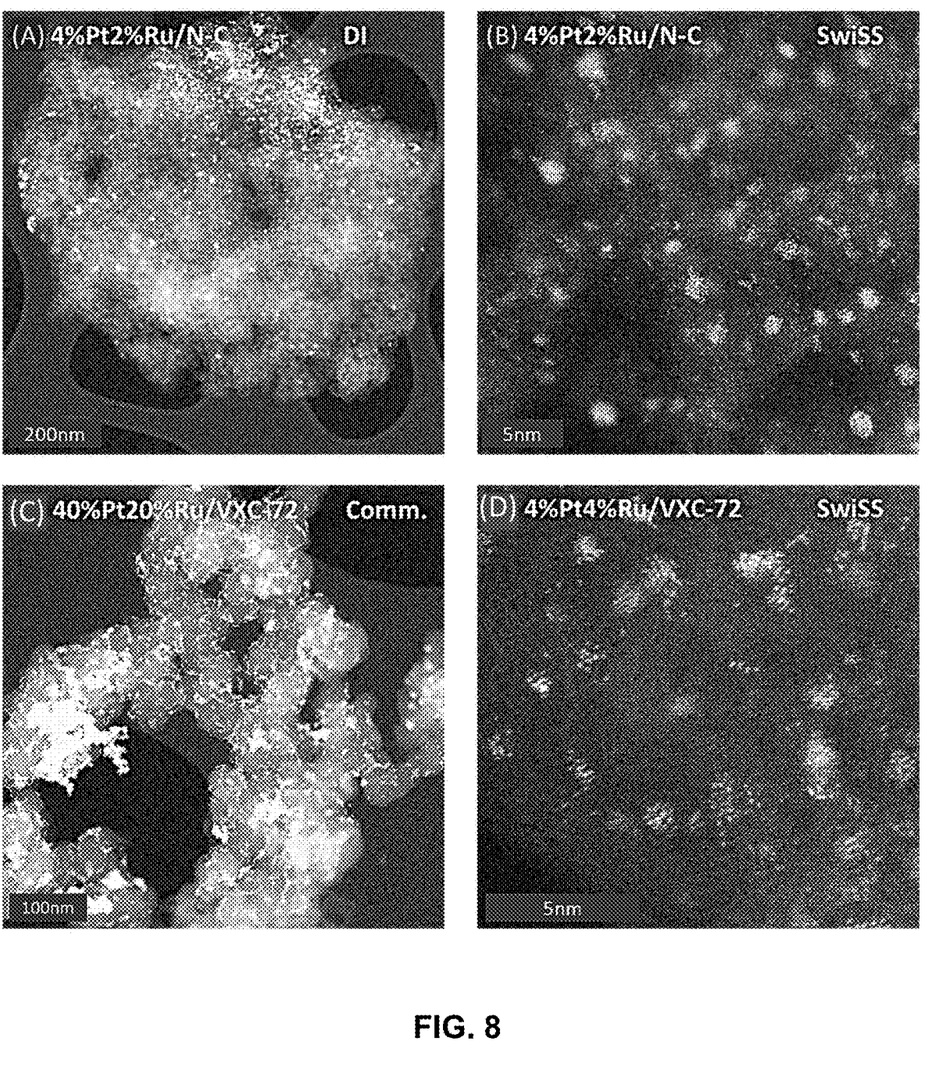
FIG. 8 presents AC-STEM images of commercially available platinum group metal (PGM) anode side catalysts as may be utilized in anion exchange membrane fuel cells and catalysts of the same component content formed according to disclosed methods.

FIG. 8 presents AC-STEM images of typical anode side catalyst systems including commercial materials 4% Pt 2% Ru/N—C and 40% Pt 20% Ru/VXC-72 at (A) and (C), respectively, and catalyst systems formed according to disclosed methods at (B) 4% Pt 2% Ru/N—C and (D) 4% Pt 4% Ru/VXC-72.

Figure 9:
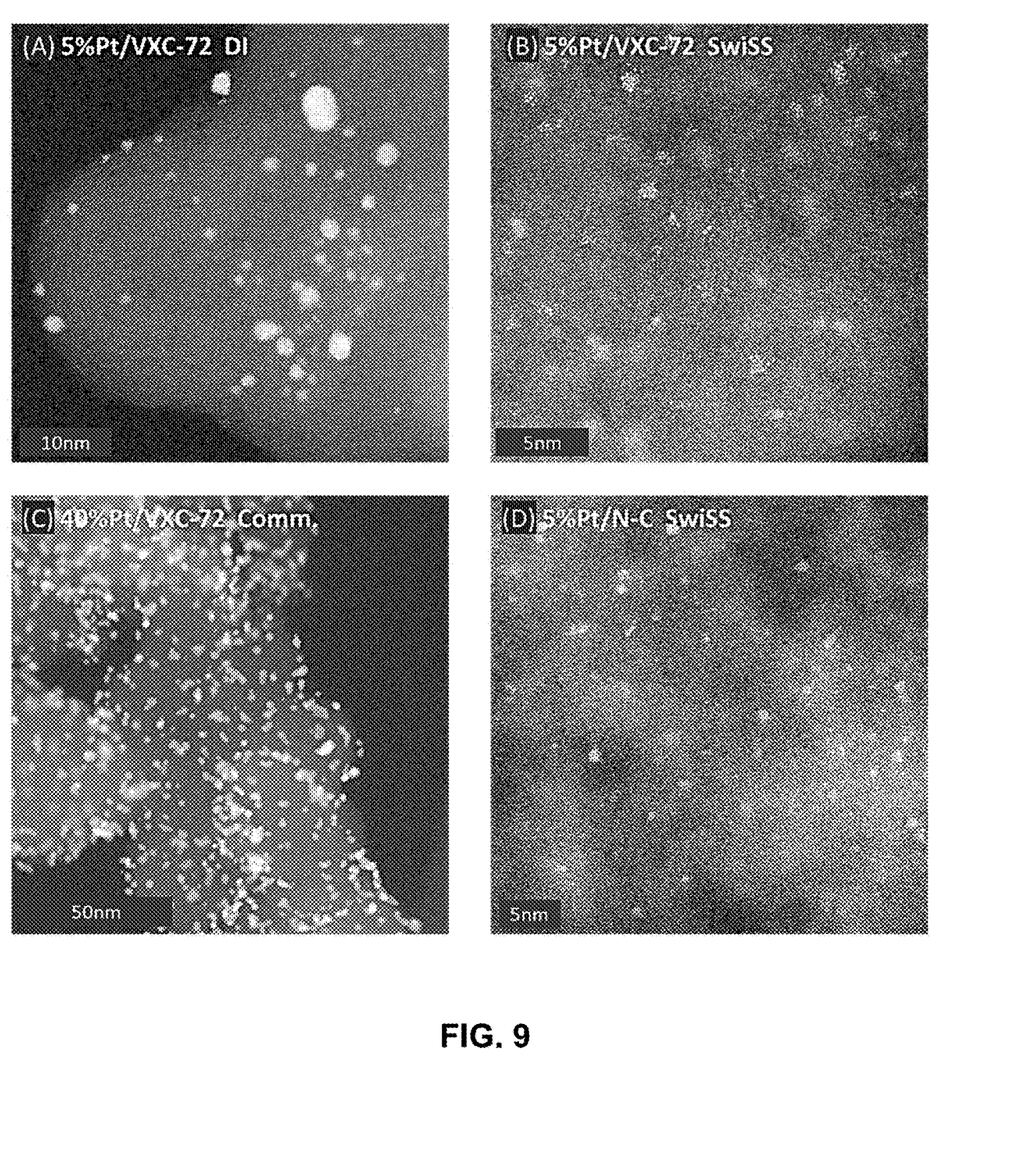
FIG. 9 presents AC-STEM images of commercially available PGM cathode side catalysts as may be utilized in anion exchange membrane fuel cells and catalysts of the same component content formed according to disclosed methods.

FIG. 9 presents AC-STEM images of typical cathode side catalyst systems, including commercial materials 5% Pt/VXC-72 and 40% Pt/VXC-72 at (A) and (C), respectively, and catalyst systems formed according to disclosed methods at (B) 5% Pt/VXC-72 and (C) 5% Pt/N—C.

Figure 11:
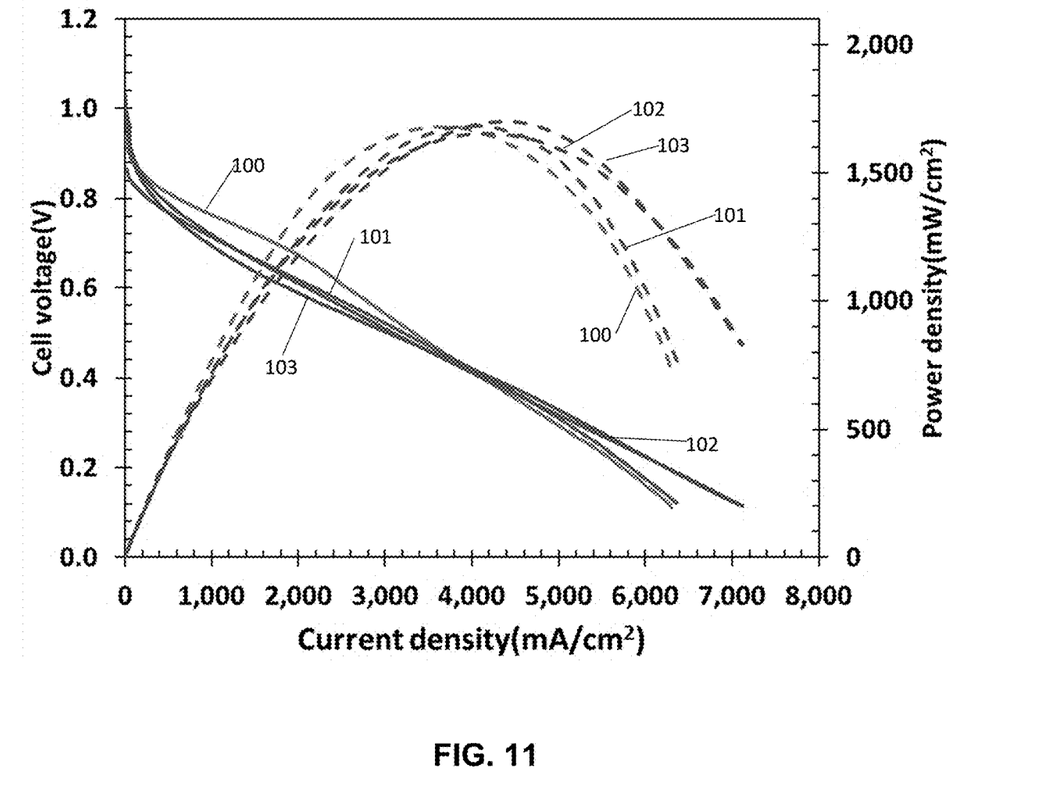
FIG. 11 compares performance data for commercially available catalysts and catalysts formed according to disclosed methods when utilized in anion exchange membrane fuel cells.

AEMFCs as illustrated in FIG. 10 were formed using commercial catalyst systems and catalyst systems formed according to disclosed methods. Systems included:

A commercial system used as a comparative system that included a commercial cathode of 40 wt % Pt/VXC-72 with a cathode loading of 0.55 mg Pt/cm$^2$ on 5% PTFE, and an anode of 40% Pt 20% Ru/VXC-72 with an anode loading of 0.68 mg PtRu/cm$^2$. This system was run with a back pressure of 200 kPa applied at the cathode side. FIG. 11 illustrates change in cell voltage (100, solid line) and power density (100, dashed line) with current density for this cell.

An inventive system including a cathode of 5 wt.% Pt/VXC-72 with a cathode loading of 0.035 mgPt/cm$^2$ on 5% PTFE, and an anode of 4% Pt 2% Ru/N—C with an anode loading of 0.055 mg PtRu/cm$^2$. This system was run under three conditions:

1—run temperatures including 68° C. anode temperature, 74° C. cathode temperature, and 80° C. cell temperature, with back pressure of 80 kPa at the cathode side. FIG. 11 illustrates change in cell voltage (101, solid line) and power density (101, dashed line) with current density for this cell at these conditions.

2—run temperatures including 74° C. anode temperature, 77° C. cathode temperature, and 80° C. cell temperature, with back pressure of 140 kPa applied at the anode side. FIG. 11 illustrates change in cell voltage (102, solid line) and power density (102, dashed line) with current density for this cell at these conditions.

3—run temperatures including 74° C. anode temperature, 77° C. cathode temperature, and 80° C. cell temperature, with back pressure of 30 kPa applied at the cathode side. FIG. 11 illustrates change in cell voltage (103, solid line) and power density (103, dashed line) with current density for this cell at these conditions.

The fuel cell employing catalyst of the present disclosure included ultra-small platinum-ruthenium well-alloyed nanoparticles on the anode side, which resulted in larger number of dual active centers. The fuel cell including catalyst systems formed according to disclosed methods reduced the PTG cathode loading by factor of 0.55/0.035=15.7 reduced the PGM anode loading by factor of 0.68/0.055=12.3. As indicated in FIG. 11, disclosed systems also reached better performance in higher current densities.

While certain embodiments of the disclosed subject matter have been described using specific terms, such description is for illustrative purposes only, and it is to be understood that changes and variations may be made without departing from the spirit or scope of the subject matter.

What is claimed is:

1. A method of forming a supported catalyst comprising:
    dissolving a precursor salt in a first solvent to form a first precursor solution;
    contacting a support with the first precursor solution such that following the contact, the first precursor solution is present on a surface of the support;
    following the contact, displacing the first solvent of the first precursor solution present on the surface of the support with a second solvent, wherein the second solvent has a lower surface tension on the support than the first solvent; and
    activating the precursor to form the catalyst.

2. The method of claim 1, wherein the first solvent comprises water.

3. The method of claim 1, wherein the second solvent comprises acetone or ethanol.

4. The method of claim 1, wherein the precursor salt comprises a transition metal salt comprising a bicarbonate, carbonate, chlorate, perchlorate, cyanide, hydroxide, iodate, nitrate, nitrite, sulphate, hydrogen sulphate, sulphite, dithionate, thiosulphate, alkoxide, carboxylate, sulphonate, or a halide.

5. The method of claim 4, wherein the transition metal is a platinum group metal.

6. The method of claim 1, wherein the support comprises particles.

7. The method of claim 6, wherein the particles have an average particle size of about 100 nm or less.

8. The method of claim 1, wherein the support comprises a metal oxide, kieselguhr, diatomaceous earth, bentonite, a zeolite, or combinations thereof.

9. The method of claim 1, wherein the support comprises carbon.

10. The method of claim 1, wherein the support comprises carbon black, activated carbon, graphite, fluoridated carbon, or diamond.

11. The method of claim 1, wherein the support comprises reactive functionality.

12. The method of claim 1, wherein the step of displacing the first solvent comprises adding the second solvent to a dispersion or suspension comprising the support and the first precursor solution.

13. The method of claim 12, wherein the second solvent is added to the dispersion or suspension in a molar ratio to the first solvent of about 1 or greater.

14. The method of claim 1, wherein the first solvent has a higher dipole moment than the second solvent.

15. The method of claim 1, wherein the second solvent has a higher dipole moment that the first solvent.

16. A catalyst system formed according to the method of claim 1.

17. The catalyst system of claim 16, wherein the catalyst system comprises single atom catalysts.

18. The catalyst system of claim 17, wherein the catalyst system comprises the single atom catalysts in conjunction with clusters and nanoparticles of the catalyst.

19. The catalyst system of claim 16, wherein the catalyst system is a platinum group metal catalyst system.

* * * * *